(12) United States Patent
Yu et al.

(10) Patent No.: US 7,645,703 B2
(45) Date of Patent: Jan. 12, 2010

(54) METHOD AND STRUCTURE FOR ALUMINUM CHEMICAL MECHANICAL POLISHING

(75) Inventors: Chris C. Yu, Shanghai (CN); Chunxiao Yang, Shanghai (CN); Ziru Ren, Shanghai (CN); Herb Huang, Shanghai (CN)

(73) Assignee: Semiconductor Manufacturing International (Shanghai) Corporation, Shanghai (CN)

( * ) Notice: Subject to any disclaimer, the term of this patent is extended or adjusted under 35 U.S.C. 154(b) by 376 days.

(21) Appl. No.: 11/387,248

(22) Filed: Mar. 22, 2006
(Under 37 CFR 1.47)

(65) Prior Publication Data
US 2007/0026557 A1     Feb. 1, 2007

Related U.S. Application Data

(63) Continuation of application No. 11/190,219, filed on Jul. 26, 2005, now abandoned.

(51) Int. Cl.
*H01L 21/461* (2006.01)
(52) U.S. Cl. .............................. 438/692; 257/E21.214; 257/E21.237; 257/E21.304; 257/E21.483; 438/633; 438/688
(58) Field of Classification Search .......... 257/E21.214; 257/E21.237, E21.304, E21.483; 438/633, 438/688, 692
See application file for complete search history.

(56) References Cited

U.S. PATENT DOCUMENTS

| | | | | |
|---|---|---|---|---|
| 6,037,197 A | * | 3/2000 | Yamazaki et al. | 438/151 |
| 6,163,055 A | * | 12/2000 | Hirakata et al. | 257/347 |
| 6,221,775 B1 | * | 4/2001 | Ference et al. | 438/691 |
| 7,241,692 B2 | * | 7/2007 | Yu et al. | 438/688 |

* cited by examiner

*Primary Examiner*—Asok K Sarkar
(74) *Attorney, Agent, or Firm*—Townsend and Townsend and Crew LLP

(57) ABSTRACT

A method for chemical mechanical polishing of mirror structures. Such mirror structures may be used for displays (e.g., LCOS, DLP), optical devices, and the like. The method includes providing a semiconductor substrate, e.g., silicon wafer. The method forms a first dielectric layer overlying the semiconductor substrate and forms an aluminum layer overlying the dielectric layer. The aluminum layer has a predetermined roughness of greater than 20 Angstroms RMS. The method patterns the aluminum layer to expose portions of the dielectric layer. The method includes forming a second dielectric layer overlying the patterned aluminum layer and exposed portions of the dielectric layer. The method removes a portion of the second dielectric layer. The method processes regions overlying the patterned aluminum layer using a touch-up polishing process to reduce a surface roughness of the patterned aluminum to less than 5 Angstroms and eliminate the dielectric residue overlaying the patterned aluminum to form a mirror surface on the patterned aluminum.

12 Claims, 3 Drawing Sheets

Schematic of a LCOS Structure

FIGURE 1 Schematic of a LCOS Structure

METHOD AND STRUCTURE FOR ALUMINUM CHEMICAL MECHANICAL POLISHING

CROSS-REFERENCES TO RELATED APPLICATIONS

This Continuation Application claims priority to Chinese Application No. 20041008564.4; filed on May 18, 2004 and U.S. patent application Ser. No. 11/190,219 filed Jul. 26, 2005 commonly assigned, and of which are incorporated by reference for all purposes.

BACKGROUND OF THE INVENTION

The present invention is directed to integrated circuits and their processing for the manufacture of electronic devices. More particularly, the invention provides a method for manufacturing an electrode structure for a liquid crystal on silicon ("LCOS") device for displays. But it would be recognized that the invention has a much broader range of applicability.

Electronic display technologies have rapidly developed over the years. From the early days, cathode ray tube technology, commonly called CRTs, outputted selected pixel elements onto a glass screen in conventional television sets. These television sets originally output black and white moving pictures. Color television sets soon replaced most if not all black and white television units. Although very successful, CRTs were often bulky, difficult to make larger, and had other limitations.

CRTs were soon replaced, at least in part, with liquid crystal panel displays. These liquid crystal panel displays commonly called LCDs used an array of transistor elements coupled to a liquid crystal material and color filter to output moving pictures in color. Many computer terminals and smaller display devices often relied upon LCDs to output video, text, and other visual features. Unfortunately, liquid crystal panels often had low yields and were difficult to scale up to larger sizes. These LCDs were often unsuitable for larger displays often required for television sets and the like.

Accordingly, projection display units have been developed. These projection display units include, among others, a counterpart liquid crystal display, which outputs light from selected pixel elements through a lens to a larger display to create moving pictures, text, and other visual images. Another technology is called "Digital Light Processing" (DLP), which is a commercial name from Texas Instruments Incorporated (TI) of Texas, USA. DLP is often referred to as the use of "micro-mirrors." DLP relies upon a few hundred thousand tiny mirrors, which line up in 800 rows of 600 mirrors each. Each of the mirrors is hinged. An actuator is attached to each of the hinges. The actuator is often electrostatic energy that can tilt each of the mirrors at high frequency. The moving mirrors can modulate light, which can be transmitted through a lens and then displayed on a screen. Although DLP has been successful, it is often difficult to manufacture and subject to low yields, etc.

Yet another technique is called LCOS. LCOS uses liquid crystals applied to a reflective mirror substrate. As the liquid crystals "open" or "close," light is reflected or blocked, which modulates the light to create an image for display. Compared to the conventional transmissive LCD, a reflective LCOS display allows more light to be passed through the optics and therefore it provides a higher luminance. Often times, there are at least three LCOS chips, each corresponding to light in red, green, and blue channels. LCOS, however, has many limitations. As merely an example, LCOS is often difficult to manufacture. Additionally, LCOS requires at least the three chips that make the projector bulky and heavy and leads to high costs.

Conventional LCOS also uses aluminum material as a reflective film for electrodes. Typically, the conventional aluminum mirror is formed by etch process. Etch and its subsequent processing often degrades the aluminum surface quality. Defects such as pits and scratches could occur on aluminum mirrors. In addition, surface roughness of deposited aluminum often exceeds 20 Å. Also there is wafer center to edge non-uniformity caused by film deposition and etch.

From the above, it is seen that an improved technique for processing devices is desired.

BRIEF SUMMARY OF THE INVENTION

According to the present invention, techniques for processing integrated circuits for the manufacture of electronic devices are provided. More particularly, the invention provides a method for manufacturing an electrode structure for a liquid crystal on silicon ("LCOS") device for displays. But it would be recognized that the invention has a much broader range of applicability.

In a specific embodiment, the invention provides a method of chemical mechanical polishing of mirror structures. Such mirror structures may be used for displays (e.g., LCOS, DLP), optical devices, and the like. The method includes providing a semiconductor substrate, e.g., silicon wafer. The method forms a first dielectric layer overlying the semiconductor substrate and forms an aluminum layer overlying the dielectric layer. The aluminum layer has a predetermined roughness of greater than 20 Angstroms RMS. The method patterns the aluminum layer to expose portions of the dielectric layer. The method includes forming a second dielectric layer overlying the patterned aluminum layer and exposed portions of the dielectric layer. The method removes a portion of the second dielectric layer. The method processes regions overlying the patterned aluminum layer using a touch-up polishing process to reduce a surface roughness of the patterned aluminum to less than 5 Angstroms to form a mirror surface on the patterned aluminum. The word "touch-up" refers to a polishing process in which relatively small amount of material is removed ($\leqq 1000$ Å)

In an alternative specific embodiment, the invention provides a method for chemical mechanical polishing of mirror structures. The method includes providing a substrate, e.g., silicon wafer. The method includes forming a first dielectric layer overlying the semiconductor substrate and forming a metal layer overlying the dielectric layer. The metal layer has an upper surface with a first predetermined roughness as measured in RMS. The method includes processing one or more regions overlying the metal layer using a touch-up polishing process to reduce a surface roughness of the upper surface of the metal layer from the first predetermined roughness to a second predetermined roughness to form a mirror surface on the metal layer.

Many benefits are achieved by way of the present invention over conventional techniques. For example, the present technique provides an easy to use process that relies upon conventional technology. In some embodiments, the method provides higher device yields in dies per wafer. Additionally, the method provides a process that is compatible with conventional process technology without substantial modifications to conventional equipment and processes. Preferably, the invention provides for an improved mirror or electrode structure for LCOS devices used for displays. Such electrode structure uses a touch-up polishing technique that provides an improved mirror surface. Depending upon the embodiment, one or more of these benefits may be achieved. These and other benefits will be described in more throughout the present specification and more particularly below.

DETAILED DESCRIPTION OF THE INVENTION

According to the present invention, techniques for processing integrated circuits for the manufacture of electronic devices are provided. More particularly, the invention provides a method for manufacturing an electrode structure for a liquid crystal on silicon ("LCOS") device for displays. But it would be recognized that the invention has a much broader range of applicability.

Figure 1:
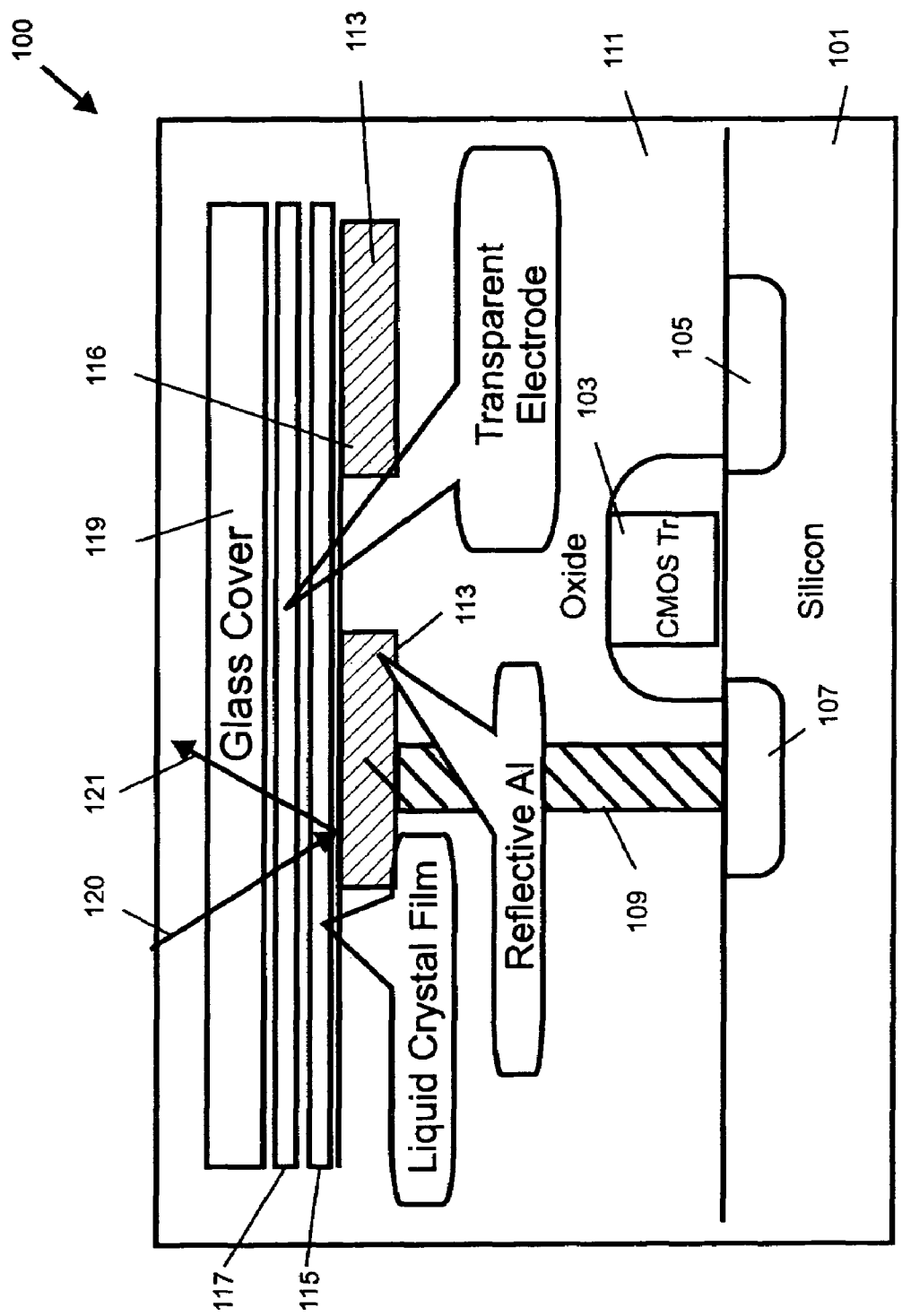
FIG. 1 is a simplified cross-sectional view diagram of an LCOS device according to an embodiment of the present invention.

FIG. 1 is a simplified cross-sectional view diagram of an LCOS device 100 according to an embodiment of the present invention. This diagram is merely an example, which should not unduly limit the scope of the claims herein. One of ordinary skill in the art would recognize many variations, alternatives, and modifications. As shown, the LCOS device 100 has a semiconductor substrate 101, e.g., silicon wafer. An MOS device layer 103 is formed overlying the semiconductor substrate. Preferably, the MOS device layer has a plurality of MOS devices. Each of the MOS devices has a contact region 107 for an electrode and a contact region 105 for a voltage potential. A planarized interlayer dielectric layer 111 is formed overlying the MOS device layer. The LCOS device also has a plurality of recessed regions within a portion of the interlayer dielectric layer and a metal layer (e.g., aluminum) to fill each of the recessed regions to form respective plurality of electrode regions 113 corresponding to each of the recessed regions. Each of the electrode regions is respectively coupled to at least one of the MOS devices among the plurality of MOS devices via interconnect structure 109, which may be a plug or other like structure. A protective layer is formed overlying surface regions of each of the plurality of electrode regions to protect the surface regions. A mirror finish 116 is on each of the surface regions. Preferably, the mirror finish is substantially free from surface defects such as pits and scratches, and it is as smooth as possible and it is high reflective. In this invention, chemical mechanical polishing is used to meet the above-mention mirror surface requirement. More preferably, the chemical mechanical polishing process used is a touch-up polishing process with certain conditions. Each of the electrodes may have a thickness ranging from about 2000 Angstroms to about 4000 Angstroms and can be at other dimensions. Each of the electrodes represents a pixel element in an array of pixel elements for the LCOS device. Also shown are liquid crystal film 115 overlying the electrodes. The LCOS device also has a transparent electrode layer (e.g., indium tin oxide) 117 and an overlying glass plate 119 to enclose the multilayered structure. Details on ways of operating the LCOS device can be found throughout the present specification and more particularly below.

To operate the LCOS device, light 120 traverses through the glass cover, through the transparent electrode, and to the liquid crystal film. When the electrode is not biased, the liquid crystal film is essentially in the off position, which does not allow the light to pass therethrough. Rather, light is blocked and does not reflect off of the mirror surface of the electrode. When the electrode is biased via MOS device, the liquid crystal film is in an on-position, which allows light to pass 121. The light reflects off of the surface of the electrode and through the liquid crystal film, which is in an on-position. Preferably, the mirror surface is substantially free from imperfections. Accordingly, at least 93% of the incoming light passes out 121 of the LCOS device. Details on ways of fabricating the LCOS device can be found throughout the present specification and more particularly below.

A method for fabricating an electrode structure for an LCOS device according to an embodiment of the present invention may be outlined as follows:

1. Provide a substrate;
2. Form a layer of transistor elements overlying the substrate;
3. Form a first interlayer dielectric layer overlying the layer of transistor elements;
4. Form barrier metal layer overlying the first interlayer dielectric layer;
5. Form an aluminum layer overlying barrier metal layer on the first interlayer dielectric layer;
6. Mask the aluminum layer;
7. Pattern the aluminum layer to form a plurality of electrode regions, each of the electrode regions corresponding to a pixel element;
8. Form border regions surrounding each of the pixel elements using exposed regions of the first interlayer dielectric layer;
9. Form a second dielectric layer overlying each of the pixel elements and exposed regions of the first interlayer dielectric layer;
10. Perform a chemical mechanical planarization process overlying the second dielectric layer to reduce a thickness of the second dielectric layer;
11. Continue to reduce the thickness of the second dielectric layer until a surface region of each of the electrode regions is exposed;
12. Touch-up polishing the surface region of each of the electrode regions using the chemical mechanical planarization process to reduce a surface roughness of the surface region from a first predetermined level to a second predetermined level; and
13. Form a protective layer overlying surface regions of the patterned aluminum layer;
14. Provide a liquid crystal layer overlying the protective layer, a transparent electrode layer overlying the liquid crystal layer, and a glass layer overlying the transparent electrode layer to form the LCOS device; and
15. Perform other steps, as desired.

The above sequence of steps provides a method according to an embodiment of the present invention. As shown, the method uses a combination of steps including a way of forming an electrode structure for an LCOS device. Other alternatives can also be provided where steps are added, one or more steps are removed, or one or more steps are provided in a different sequence without departing from the scope of the claims herein. Further details of the present method can be found throughout the present specification and more particularly below.

Figure 2:
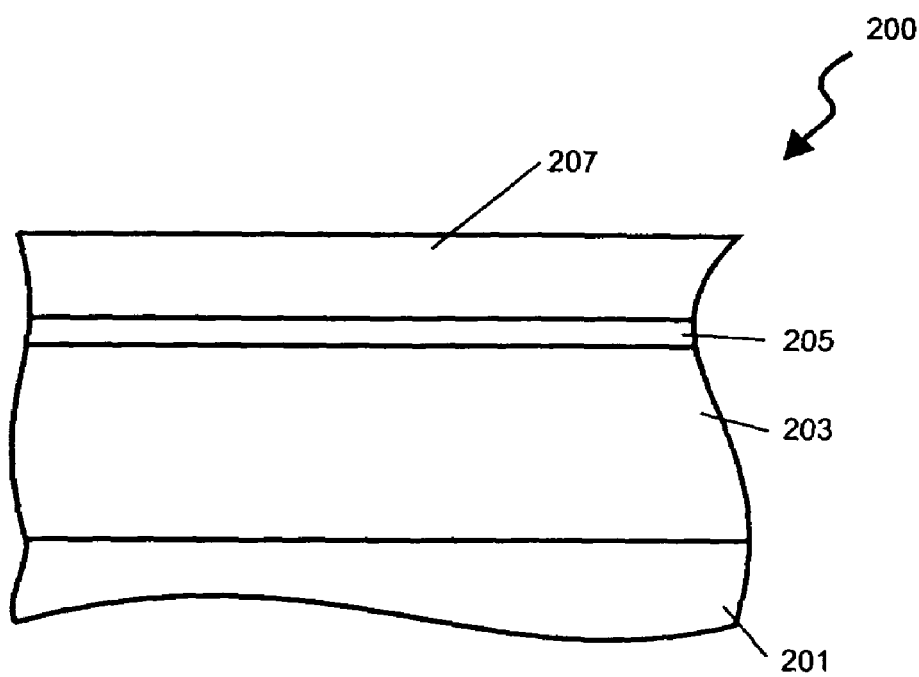
FIGS. 2 through 7 are simplified cross-sectional view diagrams illustrating methods for fabricating an LCOS device according to embodiments of the present invention
Figure 3:
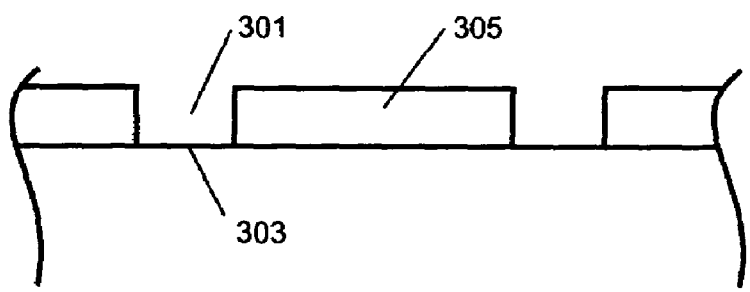
Figure 4:
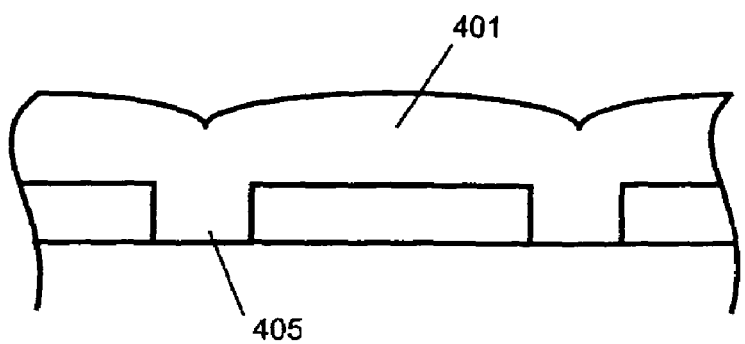

FIGS. 2 through 4 illustrate a method for forming an LCOS device according to an embodiment of the present invention. These diagrams are merely examples, which should not unduly limit the scope of the claims herein. One of ordinary skill in the art would recognize many variations, alternatives, and modifications. Referring to FIG. 2, the method begins by providing a semiconductor substrate 201, e.g., silicon wafer. The method includes forming a transistor layer overlying the substrate. Preferably, the transistor layer has a plurality of MOS devices, each of which includes a first contact region and a second contact region. The method also includes forming an interlayer dielectric layer 203 overlying the transistor layer. The dielectric layer can be made of BPSG, FSG, oxide, any combination of these, and the like. Preferably, the dielectric layer is formed using a chemical vapor deposition process. The method then planarizes the interlayer dielectric layer to form a planarized surface region. Optionally, the dielectric layer has already been planarized.

Referring again to FIG. 2, the method includes forming a barrier metal layer 205 overlying the planarized surface region of the planarized interlayer dielectric layer. The barrier metal layer can be made from any suitable material such as titanium nitride, titanium/titanium nitride, and the like. The method includes forming a metal layer (e.g., aluminum) 207 overlying the barrier metal layer. The metal layer such as aluminum is sputtered. The metal layer has a surface that is substantially planar but has certain defects such as surface roughness and other imperfections. In a specific embodiment, the metal layer has a predetermined roughness of 20 Å and greater using a sputtering process. Each of the electrode regions is respectively coupled to each of the MOS devices among the plurality of MOS devices.

Referring to FIG. 3, the method includes masking the upper surface of the aluminum layer. The mask is patterned to expose certain regions of the aluminum layer. The method patterns the aluminum layer to form a plurality of electrode 305 regions. Each of the electrode regions corresponds to a pixel element. The method forms border regions 301 surrounding each of the pixel elements using exposed regions 303 of the interlayer dielectric layer. Each of pixel elements has a width of about 4 μm to about 50 μm, and a thickness of about 2000 Å to 10000 Å. Of course, one of ordinary skill in the art would recognize other variations, modifications, and alternatives.

According to a specific embodiment, the method forms a second dielectric layer 401 overlying each of the pixel elements and exposed regions of the first interlayer dielectric layer, as illustrated by the simplified diagram of FIG. 4. the second dielectric can be any suitable material or materials. That is, the dielectric layer can be made of BPSG, FSG, oxide, HDP any combination of these, and the like. Preferably, the dielectric layer is formed using a chemical vapor deposition process.

Figures 5, 6, 7:
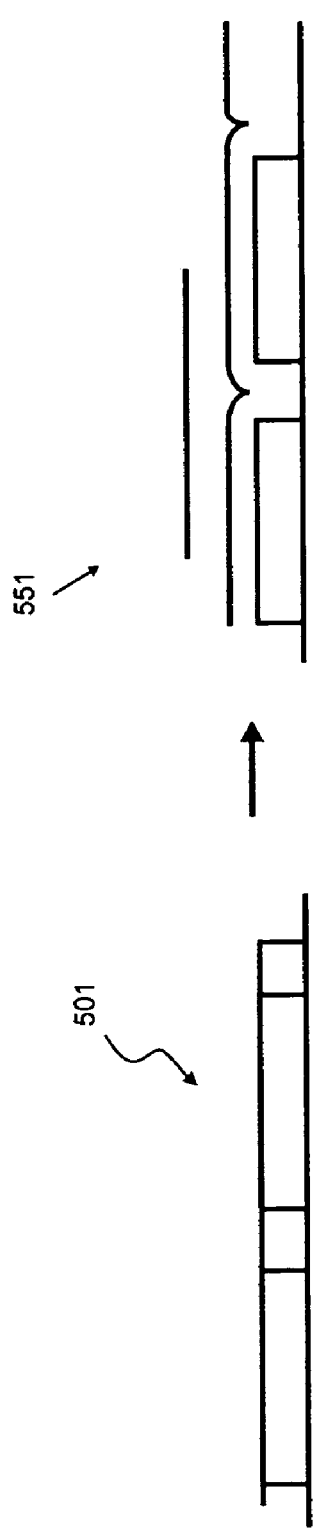

The method then performs a chemical mechanical planarization process 501 overlying the second dielectric layer to reduce a thickness of the second dielectric layer, as illustrated by FIG. 5. The method continues to reduce the thickness of the second dielectric layer until a surface region of each of the electrode regions is exposed. Preferably, the method touch-up polishes the surface region of each of the electrode regions using the chemical mechanical planarization process to reduce a surface roughness of the surface region from a first predetermined level to a second predetermined level.

Depending upon the application, the touch-up polishing operation for aluminum metal can be conducted with suitable parameters. In a specific embodiment, the touch-up polishing process can be provided on a chemical mechanical polishing tool such as EPO-222 manufactured by EBARA, but can be others. The touch-up polishing is characterized by applying a polishing head rotating at a head speed of 5 to 40 RPM. The touch-up polishing process comprises applying a polishing table comprising a soft pad such as those called Polytex manufactured by Rodel onto the regions overlying the patterned aluminum layer. Preferably, the touch-up polishing process uses selected slurry mixtures. An example of such a slurry mixture consists of silica dispersion with added chemical components for aluminum surface oxidation and passivation. The slurry mixture includes plurality of silica particles having a particle diameter ranging from about 30 nm to about 200 nm in a solution having a pH of 3.5 and less. Preferably, the polishing process is performed on a rotatable table that has a table speed of 5 to 36 RPM. The down force of the polishing pad onto the surface of the substrate ranges from about 1-3 PSI according to certain embodiments. Preferably, the touch-up polishing process is characterized by an aluminum removal rate of 50 to 1000 Å/min. The touch-up polishing process removes at least about 50 Angstroms off of the upper surface of the patterned aluminum layer and removes no greater than 2000 Angstroms of the upper surface according to a specific embodiment. According to a specific embodiment, the resulting mirror surface is characterized by a reflectivity of 93 percent and greater and RMS surface roughness of 5 Å or below. Of course, there can be other alternatives, variations, and modifications.

Optionally, the method performs a combination of chemical mechanical planarization, etch back, and touch-up polishing, as illustrated by FIGS. 5, 6, and 7. The method performs oxide chemical mechanical planarition process 551. The method uses selected process conditions on a TERES tool manufactured by LAM RESEARCH. The polishing is characterized by applying a polishing head rotating at a head speed of 15 to 30 RPM. The polishing process comprises applying a polishing pad comprising a polyurethane material such as those called IC1000 manufactured by Rodel onto the regions overlying the oxide layer. Preferably, the polishing process uses selected slurry mixtures. An example of such a slurry mixture is called ss-25 (not selected one) manufactured by Cabot Microelectronics of USA. The slurry mixture includes plurality of silica particles having a particle diameter ranging from about 80 mm to about 200 nm in a solution having a pH of 10.8 to 11.2. Preferably, the polishing process is performed on a rotatable belt that has a belt speed of 275 ft/min. The down force of the polishing pad onto the surface of the substrate ranges from about 5.0 PSI according to certain embodiments. Preferably, the polishing process is characterized by an oxide removal rate of 3000 to 4500 Å/min. The oxide polishing process removes at least about 5000 Angstroms off of the upper surface of oxide layer to a region within a vicinity of the upper surface of the patterned aluminum layer. Of course, there can be other variations, modifications, and alternatives.

The method performs an etch back process 601, as illustrated by FIG. 6. The etch back process can be dry or wet or a combination of these. The etch back process occurs until the upper surface of the patterned aluminum layer has been exposed. The method then performs a touch-up polishing process 701, as illustrated by FIG. 7. In a specific embodiment, the touch-up polishing process can be provided on a chemical mechanical polishing tool such as EPO-222 manufactured by EBARA, but can be others. The touch-up polishing is characterized by applying a polishing head rotating at a head speed of 5 to 40 RPM. The touch-up polishing process comprises applying a polishing pad comprising a soft material such as those called Polytex manufactured by Rodel onto the regions overlying the patterned aluminum layer. Preferably, the touch-up polishing process uses selected slurry mixtures. The slurry mixture includes plurality of silica particles having a particle diameter ranging from about 30 nm to about 200 nm in a solution having a pH of 3.5 and less. Preferably, the polishing process is performed on a rotatable table that has a table speed of 5 to 36 RPM. The down force of the polishing pad onto the surface of the substrate ranges from about 1-3 PSI according to certain embodiments. Preferably, the touch-up polishing process is characterized by an aluminum removal rate of 50 to 1000 Å/min. The touch-up polishing process removes at least about 50 Angstroms off of the upper surface of the patterned aluminum layer and removes no greater than 2000 Angstroms of the upper surface according to a specific embodiment. According to a specific embodiment, the resulting mirror surface is characterized by a reflectivity of 93 percent and greater and a RMS surface roughness $\leqq 5$ Å. Of course, there can be other alternatives, variations, and modifications.

The method also includes forming a protective layer overlying surface regions of each of the plurality of electrode regions to protect the surface regions having a mirror finish for each of the electrode regions. Preferably, at least 91% of the light is reflected back from the mirror finish in completed LCOS devices. The protective layer can be formed by treating the surface of the bare aluminum layer with an oxidizing fluid such as hydrogen peroxide, BTA, ozone/water mixtures, and the like. The oxidizing fluid is substantially clean and forms a passivation layer overlying the bare aluminum layer. Depending upon the embodiment, there can be other variations, modifications, and alternatives.

To complete the LCOS device, the method forms a sandwiched layer having liquid crystal materials. Here, a liquid crystal film is formed overlying the electrodes. A transparent electrode structure is formed overlying the liquid crystal film. The method forms a glass plate overlying the transparent electrode. The sandwiched structure is often formed as an assembly, which is later disposed onto surfaces of the electrodes of the LCOS devices. Of course, one of ordinary skill in the art would recognize many variations, alternatives, and modifications.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for chemical mechanical polishing of mirror structures, the method comprising:
   providing a semiconductor substrate;
   forming a first dielectric layer overlying the semiconductor substrate;
   forming an aluminum layer overlying the dielectric layer, the aluminum layer having an upper surface with a predetermined roughness of greater than 20 Angstroms in RMS;
   patterning the aluminum layer to expose portions of the dielectric layer, the exposed portions forming borders surrounding one of a plurality of patterns of the patterned aluminum layer, the one of the plurality of patterns corresponding to a pixel element;
   forming a second dielectric layer overlying the patterned aluminum layer and exposed portions of the dielectric layer;
   removing a portion of the second dielectric layer to a region within a vicinity of the upper surface of the patterned aluminum layer;
   processing regions overlying the patterned aluminum layer using a touch-up polishing process to reduce a surface roughness of the upper surface of the patterned aluminum to less than 5 Angstroms to form a mirror surface on the upper surface of the patterned aluminum, the mirror surface corresponding to the pixel element, wherein the processing includes processing the upper surface of the patterned aluminum; and
   depositing a protective layer overlying the upper surface of the patterned aluminum to protect the mirror surface.

2. The method of claim 1 wherein the touch-up polishing process is characterized by applying a polishing head rotating at a head speed of 5 to 40 RPM.

3. The method of claim 1 wherein the touch-up polishing process comprises applying a soft pad (Rodel Polytex pad) onto the regions overlying the patterned aluminum layer.

4. The method of claim 1 wherein the touch-up polishing process comprises applying a slurry mixture to the regions being processed.

5. The method of claim 1 wherein the touch-up polishing process comprises providing the semiconductor substrate on a rotatable table, the rotatable table rotating the substrate at a table speed of 5 to 36 RPM.

6. The method of claim 1 wherein the touch-up polishing process is characterized using by a down force of 1-3 PSI.

7. The method of claim 1 wherein the touch-up polishing process is characterized by an aluminum removal rate of 50 to 1000 Å/min.

8. The method of claim 1 wherein the mirror surface is characterized by a reflectivity of 91 percent and greater and a surface roughness in RMS $\leqq 5$ Å.

9. The method of claim 1 wherein the patterned aluminum layer is characterized by a reflectivity ranging from about 83% to about 91% and the mirror surface is characterized by a reflectivity greater than 91%.

10. The method of claim 1 wherein the touch-up polishing process comprises a plurality of silica particles having a particle diameter ranging from about 30 nm to about 200 nm in a solution having a pH of 3.5 and less.

11. The method of claim 1 wherein the touch-up polishing process removes at least about 50 Angstroms off of the upper surface of the patterned aluminum layer and removes no greater than 1000 Angstroms of the upper surface.

12. A method for chemical mechanical polishing of mirror structures, the method comprising:
    providing a substrate;
    forming a first dielectric layer overlying the semiconductor substrate;
    forming a metal layer overlying the dielectric layer, the metal layer having an upper surface with a first predetermined roughness as measured in RMS; and
    forming a second dielectric layer overlying the patterned metal layer;
    processing one or more regions overlying the metal layer using a touch-up polishing process to reduce a surface roughness of the upper surface of the metal layer from the first predetermined roughness to a second predetermined roughness to form a mirror surface on the metal layer, wherein the one or more regions overlying the metal layer include the second dielectric layer; and
    depositing a protective layer overlying the upper surface of the metal layer to protect the mirror surface on the metal layer.

* * * * *

UNITED STATES PATENT AND TRADEMARK OFFICE
CERTIFICATE OF CORRECTION

PATENT NO. : 7,645,703 B2 Page 1 of 1
APPLICATION NO. : 11/387248
DATED : January 12, 2010
INVENTOR(S) : Yu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 516 days.

Signed and Sealed this

Sixteenth Day of November, 2010

David J. Kappos
*Director of the United States Patent and Trademark Office*